United States Patent [19]

McKeon et al.

[11] Patent Number: 5,053,620

[45] Date of Patent: Oct. 1, 1991

[54] LOGGING APPARATUS AND METHOD FOR DETERMINING CONCENTRATIONS OF SUBSURFACE FORMATION ELEMENTS

[75] Inventors: Donald C. McKeon, Houston, Tex.; Bronislaw Seeman, Paris, France

[73] Assignee: Schlumberger Technology Corporation, Houston, Tex.

[21] Appl. No.: 450,355

[22] Filed: Dec. 13, 1989

[51] Int. Cl.$^5$ .............................................. G01V 5/10
[52] U.S. Cl. .................................. 250/270; 250/264; 250/265
[58] Field of Search ............... 376/160, 161, 163, 165; 250/270, 390.01, 262, 390.04, 264, 265

[56] References Cited

U.S. PATENT DOCUMENTS

| | | | |
|---|---|---|---|
| 3,156,822 | 11/1964 | Tittman | 250/270 |
| 3,976,878 | 8/1976 | Chevalier et al. | 250/253 |
| 4,135,087 | 1/1979 | Oliver et al. | 250/262 |
| 4,317,993 | 3/1982 | Hertzog, Jr. et al. | 250/270 |
| 4,327,290 | 4/1982 | Plasek | 250/262 |
| 4,380,701 | 4/1983 | Smith, Jr. et al. | 250/270 |
| 4,433,240 | 2/1984 | Seeman | 250/256 |
| 4,464,569 | 8/1984 | Flaum | 250/270 |
| 4,506,156 | 3/1985 | Mougne | 250/269 |
| 4,506,219 | 3/1985 | Lee | 250/268 |
| 4,596,927 | 6/1986 | Hopkinson et al. | 250/270 |
| 4,746,801 | 5/1988 | Smith, Jr. et al. | 250/262 |
| 4,760,252 | 7/1988 | Albats et al. | 250/269 |
| 4,810,876 | 3/1989 | Wraight et al. | 250/270 |

OTHER PUBLICATIONS

"The Aluminum Activation Log" by H. D. Sott and M. P. Smith, presented at SPWLA Fourteenth Annual Logging Symposium, Lafayette, La., May 6-9, 1973.

"Geochemical Logging with Spectrometry Tools" by R. Hertzog et al., presented at 62nd Annual Technical Conference and Exhibition of the SPE in Dallas, Texas Sep. 27-30, 1987.

Primary Examiner—Carolyn E. Fields
Assistant Examiner—Drew A. Dunn
Attorney, Agent, or Firm—Henry N. Garrana; Frederic C. Wagret

[57] ABSTRACT

Method and apparatus for identifying and determining the concentrations of subsurface formation elements next to a borehole, by detecting and counting the gamma rays resulting from the activation of Al atoms by neutrons emitted by a high energy source. The total count rates from Al are corrected for Si interference by (1) calculating the ratio of the count rates of gamma rays from Si activation to the count rates of the gamma rays resulting from the inelastic collisions of neutrons with Si atoms, thus providing a reference ratio independent of environmental parameters; (2) detecting and counting the gamma rays resulting from the Si inelastic collisions; (3) determining from the count rates of silicon inelastic gamma rays and from said ratio, the count rates of Si activation gamma rays; and (4) subtracting, from the total count rates of activation gamma rays, the count rates of Si activation gamma rays.

The method comprises also detecting and counting the gamma rays resulting from the capture of said neutrons by atoms of a plurality of elements.

22 Claims, 1 Drawing Sheet

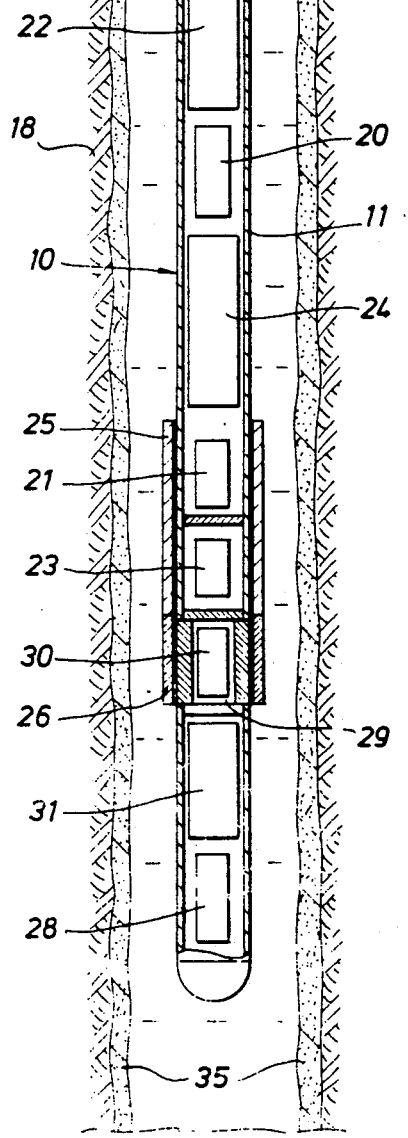
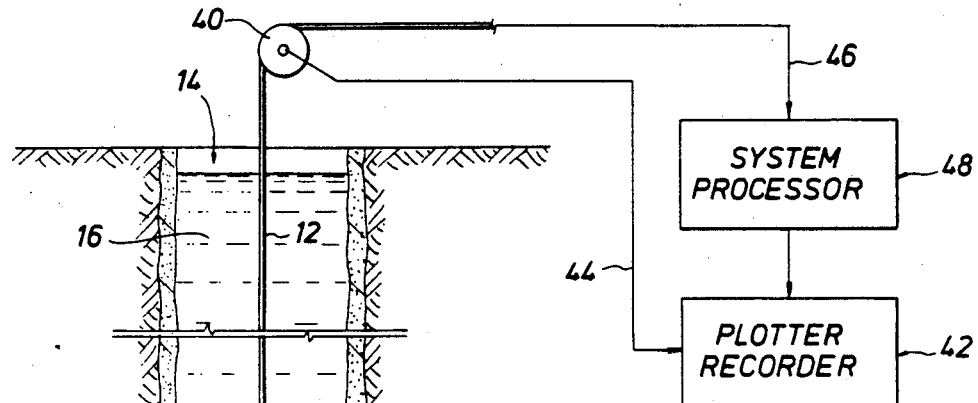
FIG.1
FIG.2
| BOREHOLE DIA. (INCHES) | FORMATION POROSITY (%) | POSITION OF THE TOOL | EQ. AL WEIGHT % |
|---|---|---|---|
| 8 | 0 | ECCENTERED | 24.06 |
| 8 | 0 | CENTERED | 11.71 |
| 8 | 15 | ECCENTERED | 12.35 |
| 8 | 15 | CENTERED | 7.19 |
| 8 | 34 | ECCENTERED | 9.85 |
| 8 | 34 | CENTERED | 6.66 |
| 12 | 0 | ECCENTERED | 26.98 |
| 12 | 0 | CENTERED | 10.87 |
| 12 | 15 | ECCENTERED | 12.38 |
| 12 | 15 | CENTERED | 7.65 |
| 12 | 34 | ECCENTERED | 9.92 |
| 12 | 34 | CENTERED | 8.25 |

LOGGING APPARATUS AND METHOD FOR DETERMINING CONCENTRATIONS OF SUBSURFACE FORMATION ELEMENTS

BACKGROUND OF THE INVENTION

1. Field of the Invention

This invention relates to investigating earth formations traversed by a borehole. More particularly, the present invention is directed to an apparatus and a method for determining element concentration values and for further characterizing the attributes of the formations surrounding a borehole.

2. The Related Art

The capital cost of drilling and evaluating a deep well, for example an oil or natural gas well, is extremely high, and for this reason considerable expense is incurred during those time intervals when drilling or production steps must be interrupted to evaluate the formation. With known analysis techniques, the concentration of some elements might be derivable from logging of the formation, but the concentrations of other elements would require the taking of core samples for analysis.

The existence and quantity of an element in a formation can be determined, as described in U.S. Pat. No. 3,665,195, by irradiating the formation with neutrons and detecting the induced gamma-ray activity from the element of interest. After determining the thermal neutron capture cross section of the formation, the product of the gamma-ray emission and the thermal neutron capture cross section is obtained as a quantitative indication of the element's abundance in the formation.

Hereafter is given a simplified view of the thermal neutron capture process. A burst of neutrons is created and propagate into the formation. Some of the neutrons are absorbed, but the majority slow down until they reach thermal energies. At thermal energies, the neutrons diffuse until they are captured by one of the nuclei of the formation. For a particular neutron, its capture will depend on the number of nuclei it "sees", weighted by the microscopic capture cross section (probability) of each nucleus (the total in a homogeneous formation is proportional to the formation capture cross section $SIGMA_{form}$). Thus, the greater the number of nuclei of a particular element, the greater the number of neutrons that will be captured by that element. In other words, the number of capture gamma rays produced is, for a particular element, proportional to the number of nuclei per volume unit multiplied by the element cross section. Once the neutrons are captured they will produce a spectrum of gamma rays specific for each element. Some of these gamma rays interact with the detector and deposit all their energy or a fraction thereof, and others are lost. Those that are detected by the detector are used for the spectral measurement. This detected spectrum is decomposed to obtain the fractional contributions or yields, $Y_i$, of each element in the total spectrum. Relative values for two $Y_i$ will be proportional to the relative atomic abundances of the elements in the formation (with the ratio weighted by many nuclear parameters, gamma-ray multiplicity, gamma-ray transmission probabilities, neutron capture cross sections, etc.). Once good relative yield measurements are provided, it is only necessary to determine the proper absolute normalization to transform these relative measurements into elemental concentrations.

In the article "The Aluminum Activation Log" by H. D. Scott and M. P. Smith published in 1973, there is described a method for measuring the aluminum content of the formation, in order to estimate the formation shale fraction. A californium-252 source of neutrons is used in conjunction with the formation thermal neutron capture cross section to produce a continuous activation log of a borehole.

The Al activation process is briefly hereafter described. In the neutron activation process, an atomic nucleus absorbs a neutron, creating an unstable isotope which decays, after some delay, usually by beta decay, with emission of associated gamma rays of characteristic energies. In aluminum activation, the natural isotope $^{27}Al$ absorbs thermal neutrons and produces the unstable isotope $^{28}Al$, which beta decays with a half-life of 2.24 minutes, emitting a 1779 keV gamma ray. This sequence is summarized below:

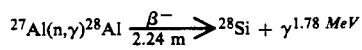

$$^{27}Al(n,\gamma)^{28}Al \xrightarrow[2.24\ m]{\beta^-} {}^{28}Si + \gamma^{1.78\ MeV}$$

The rays connected with the activation of different elements are capable of being separated, provided they have widely separated half-life characteristics. There are instances, however, where the bombardment by neutrons of two materials produces two isotopes having substantially the same half-lives and, in fact, there are instances where exactly the same radioisotope is produced from two different materials. For example, both $^{27}Al$ and $^{28}Si$ react with neutrons and produce $^{28}Al$ which has a half-life of about 2.24 minutes. It is apparent that the determination of the amount of silicon and aluminum in a formation by bombarding the formation with neutrons is thus rendered difficult because the gamma-ray activity resulting when the $^{28}Al$ atoms revert to their stable condition could not be separated into the components that are respectively due to aluminum and silicon.

As an attempt to overcome this difficulty, it has been proposed, as set forth in U.S. Pat. No. 3,156,822, to detect the resulting gamma-ray activity at a plurality of levels in the bore longitudinally spaced from the level of bombardment by distances such that the gamma-ray activities involving the different materials may be distinguished.

However, the tool disclosed in the '822 patent did not prove to be fully satisfactorily and its length is a major drawback, due to the numerous longitudinally spaced detectors.

U.S. Pat. No. 4,464,569 discloses a method for determining basic formation component volume fractions, including a spectroscopic analysis of capture gamma-ray spectra obtained from a neutron spectroscopy logging tool. The relative sensitivities of the logging tool to the specific minerals or to the chemical elements in the formation are determined either from core analysis or from tests run in known formations. The spectroscopic elemental yields and the relative sensitivities are then used together to determine the volume fractions of the basic formation components such as limestone, sandstone, porosity, salinity, dolomite, anhydrite, etc.

Nevertheless, the method described in the '569 patent does not require, and the patent does not disclose, a straight forward way for determining elemental concentrations, especially through the use of commonly available logging tools or modifications thereof. This known method takes appropriate combinations of measured yields, normalizes core data or laboratory measurements to obtain calibrated relative sensitivities and makes use of the constraint that the sum of all volume fractions is unity. Values of the volume fractions can then be found by solving the appropriate set of equations for the formation component volume fractions.

U.S. Pat. No. 4,810,876 contemplates a logging apparatus and processing methods for determining elemental concentrations, in order to assess the mineralogy of a formation, based on an indirect approach that in part relies upon certain unique assumptions.

This known method implies a substantial amount of calculation and includes some limitation due to the assumptions necessary to its implementation.

The article entitled "Geochemical Logging with Spectrometry Tools" by R. Hertzog et al., presented at the 62nd Annual Technical Conference and Exhibition of the SPE, held in Dallas, Tex. on Sept. 27-30, 1987, paper SPE 16792, discloses a Geochemical Logging Tool, known as GLT (mark of Schlumberger Technology Corporation), designed to measure natural, activation, and neutron capture gamma rays. The GLT tool produces logs of the most abundant elements and direct measurements of Al concentrations are provided. The GLT tool comprises a tool string including successively from top to bottom: (i) a natural gamma-ray tool, known as the NGS (mark of Schlumberger Technology Corporation) and depicted in U.S. Pat. No. 3,976,878; (ii) a source of low energy neutrons, preferably californium-252; (iii) an activation tool, known as AACT tool, adapted for measuring the gamma rays resulting from the activation of aluminum atoms by the neutrons emitted by the californium source; and (iv) a gamma spectrometer tool, known as the GST (trademark of Schlumberger Technology Corp.) and being such as depicted in U.S. Pat. Nos. 4,317,993 or 4,327,290; the GST tool is designed to detect gamma rays resulting from the capture of neutrons emitted by another source, i.e. a high energy (14 Mev) neutron generator provided in the string. The whole GLT tool involves three separate modes of gamma-ray spectroscopy to make a comprehensive elemental analysis of the formation. The first measurement is performed by the NGS tool which passes by the formation before any neutron source can induce radioactivity in order to derive the concentrations of K, Th, and U in the formation. The second measurement is performed by the AACT tool; the AACT tool, the NGS tool above it, and the $^{252}$Cf neutron source between them, allow a measurement of activation gamma rays to be used to derive formation aluminum concentration. The third measurement is performed by the GST tool to derive a spectrum of capture gamma rays from a plurality of elements in the formation, such as Si, Ca, Fe, S, Ti, K, and Gd. The GST tool uses a high energy (14 Mev pulsed neutron generator to induce these capture reactions.

Although the above mentioned GLT tool provides significant advantages over earlier tools, it is desirable to provide still further improvements.

Due to the relatively large number of devices composing the GLT string, the GLT turns out to be critically long.

Moreover, the safety concern with respect to the use of nuclear sources in boreholes, such as the californium source hereabove mentioned, has indubitably increased over the years. Accordingly, the regulations have become more and more stringent. For example, the activity (measured in Curies) of the sources should not exceed a given value. It is, however, difficult to determine and find a nuclear source which complies with the regulations as well as the needs of the industry.

Furthermore, the count rates related to the aluminum activation are relatively low, since the californium source has a relatively low neutron output.

Finally, since two different sources, i.e. the radioactive californium source and the high energy neutron generator are respectively used for the capture yields measurements and the aluminum activation measurements, an environmental correction for aluminum is required. Such correction is needed for taking into account the porosity and the absorption properties of the formation and of the borehole.

According to the above, there is a need for a logging tool for measuring natural, activation and neutron capture gamma rays which do not show the drawbacks hereabove mentioned.

SUMMARY OF THE INVENTION

It is a first object of the invention to provide a logging tool for measuring natural, activation and neutron capture gamma rays which is easy to use and has a reasonable length.

It is a second object of the invention to propose a logging tool for measuring gamma rays resulting from Al activation with an electronic neutron generator, avoiding the need for a chemical source.

It is a third object of the invention to provide a logging tool with increased count rates of gamma rays coming from Al activation, compared to those obtained by using a $^{252}$Cf source.

It is a fourth object of the invention to propose a logging tool having increased count rates of gamma rays resulting from thermal neutron capture.

It is a fifth object of the invention to provide a logging tool for measuring Al activation which is able to distinguish gamma rays due to Al activation from gamma rays due to Si activation.

These and further objects are attained according to the invention by a method for identifying and determining the concentrations of subsurface formation elements next to a borehole, including the steps of:

(1) irradiating the formations with neutrons from a high energy generator disposed in a logging tool lowered in the borehole;

(2) detecting and counting the gamma rays resulting from the neutron activation of atoms of at least a first element; and (3) determining from the counts of gamma rays the concentration of said first element.

Particularly, said first element is aluminum.

Advantageously, the method further includes correcting the total count rates of the gamma rays resulting from activation of atoms of said first element and of at least another element which interferes with said first element.

Said interfering element is silicon.

Preferably, said correcting step includes:

(1) calculating the ratio of the count rates of gamma rays from activation of said interfering element to the count rates of the gamma rays resulting from the inelastic collisions of neutrons with atoms of said interfering element, thus providing a reference ratio independent of environmental parameters;

(2) detecting and counting the gamma rays resulting from the inelastic collisions of the neutrons with atoms of said interfering element;
(3) deriving from the count rates of inelastic gamma rays and from said ratio the count rates of activation gamma rays relative to said interfering element; and
(4) subtracting from the total count rates of activation gamma rays the count rates of the activation gamma rays relative to said interfering element.

The method also comprises the steps of detecting and counting the gamma rays resulting from the background natural activity and subtracting the background count rates from the count rate of the activation of atoms of said first element.

In a preferred embodiment, the method comprises surrounding said neutron generator with a material of high density, such as tungsten or lead.

Preferably, the method comprises the step of providing a stand-off between the tool and the borehole wall. Preferably, the method comprises the step of centering the tool in the borehole.

The invention relates also to a method for identifying and determining the concentrations of subsurface formation elements next to a borehole, including the steps of:
(1) irradiating the formations with neutrons from a high energy generator disposed in a logging tool lowered in the borehole;
(2) detecting and counting the gamma rays resulting from the neutron activation of atoms of at least a first element;
(3) determining from the counts of gamma rays the concentration of said first element;
(4) detecting and counting the gamma rays resulting from the capture of said neutrons by atoms of at least a second element; and
(5) determining from the count rates of capture gamma rays the concentration of said second element.

Particularly, said first element is aluminum and the method further includes detecting and counting the gamma rays resulting from the capture of the neutrons by atoms of a first plurality of elements, and determining from the respective count rates of capture gamma rays relative to each element, the concentration of each element.

Said first plurality of elements comprises Si, Ca, Fe, S, H, or Cl or any combination thereof.

The method includes preventing thermal neutrons from interfering with the detection of capture gamma ray by providing a boron shield.

The method also includes detecting and counting the gamma rays resulting from the natural activity of atoms of a second plurality of elements, such as uranium, thorium, potassium.

The invention also contemplates a logging tool for identifying and determining the concentrations of subsurface formation elements next to a borehole, including a housing comprising:
(1) means for irradiating the formations with neutrons, in the form of a high energy neutron generator;
(2) means for detecting and means for counting the gamma rays resulting from the neutron activation of atoms of at least a first element; and
(3) means for determining from the counts of gamma rays the concentration of said first element.

Particularly, said element is aluminum.

Advantageously, the logging tool further includes means for correcting the total count rates of the gamma rays resulting from activation of atoms of said first element and of another element which interferes with said first element.

Said interfering element is silicon.

Preferably, said correcting means includes:
(1) means for calculating the ratio of the count rates of gamma rays from activation of said interfering element to the count rates of the gamma rays resulting from the inelastic collisions of neutrons with atoms of said interfering element, thus providing a reference ratio independent of environmental parameters;
(2) means for detecting and means for counting the gamma rays resulting from the inelastic collisions of the neutrons with atoms of said interfering element;
(3) means for deriving from the count rates of inelastic gamma rays and from said ratio the count rates of activation gamma rays relative to said interfering element; and
(4) means for subtracting from the total count rates of activation gamma rays the count rates of the activation gamma rays relative to said interfering element.

The logging tool may also include means for detecting and means for counting the gamma rays resulting from the background natural activity, and means for subtracting the background count rates from the count rates of the activation of atoms of said first element.

In a preferred embodiment, the logging tool includes a shield made of high density material, such as tungsten or lead, surrounding said neutron generator.

Preferably, the logging tool includes means for providing a stand-off between the borehole wall and the tool. Preferably, the stand-off means comprises means for centering the tool in the borehole.

The invention relates also to a logging tool for identifying and determining the concentrations of subsurface formation elements next to a borehole, including a housing comprising:
(1) means for irradiating the formations with neutrons from a high energy generator disposed in a logging tool lowered in the borehole;
(2) means for detecting and means for counting the gamma rays resulting from the neutron activation of atoms of at least a first element;
(3) means for determining from the counts of gamma rays the concentration of said first element;
(4) means for detecting and means for counting the gamma rays resulting from the capture of neutrons by atoms of at least a second element; and
(5) means for determining from the count rates of capture gamma rays the concentration of said second element.

Particularly, said first element is aluminum and the logging tool includes means for detecting and means for counting the gamma rays resulting from the capture of neutrons by atoms of a first plurality of elements, and means for determining from the respective count rates of capture gamma rays relative to each element, the concentration of each element.

Said first plurality of elements comprises Si, Ca, Fe, S, H, or Cl, or any combination thereof.

The logging tool includes a boron shield surrounding said means for detecting the capture gamma rays.

The tool may also include means for detecting and means for counting the gamma rays resulting from the natural activity of atoms of a second plurality of elements.

In a preferred embodiment, the logging tool comprises successively, from top to bottom:

(1) means for detecting and means for counting the gamma rays resulting from the natural activity of atoms of at least one element (such as uranium, thorium, or potassium);

(2) means for detecting and means for counting the gamma rays resulting from the capture of neutrons by atoms of at least another element (such as Si, Ca, Fe, S, H, or Cl);

(3) means for detecting and means for counting the gamma rays resulting from the inelastic collisions of the neutrons with atoms of at least one element (such as Si) able to interfere with the detection and count of gamma rays related to a further element (such as Al);

(4) means for irradiating the formations with neutrons, in the form of a high energy neutron generator; and (5) means for detecting and means for counting the gamma rays resulting from the neutron activation of atoms of at least said further element (such as Al).

The characteristics and advantages of the invention will appear better from the description to follow, given by way of a non limiting example, with reference to the appended drawing in which:

BRIEF DESCRIPTION OF THE DRAWINGS

FIG. 1 is a schematic side view of an embodiment of the invention in the form of a logging tool suspended in a well; and FIG. 2 is a table showing the effect on Si interference of centering the tool in the borehole.

DESCRIPTION OF THE PREFERRED EMBODIMENT

An illustrative embodiment of the apparatus and system embodying the overall method of the present invention is shown in FIG. 1 in the form of a borehole logging tool string 10 suspended by an armored cable 12 in the borehole 14. The borehole is typically filled with drilling mud 16 and is surrounded by earth formations 18. During drilling, the drilling mud deposits a solid layer of material on the borehole wall in the form of a mud cake 35.

The tool string 10 comprises an elongated housing 11 including, at the top, a communications cartridge 22 and a plurality of tools, more fully described below, and designed to acquire data for input to the process of determining the absolute or relative concentrations of a plurality of elements, the results of which are used in an overall method for determining the concentrations of substantially all significant elements within the formation 18.

It should be understood that reference herein to tool, sondes, detectors, tool systems, and the like are not to be construed as defining limitations on whether a particular function associated with a tool is to be performed by a single device or a plurality of devices or whether such devices are contained within a single tool, or a plurality of tools drawn through the borehole 14 in tandem. For convenience, the term "tool system" as used herein, shall refer to one or more individual devices that acquire and process data from the formation or borehole for use in determining a specific property or quantity of interest. Also, reference to patents or other publications in the following description should be understood to incorporate the material thereof into the present specification.

While the tool string 10 is moved through the borehole 14, an indication of its depth in the borehole is provided by a depth determining apparatus, generally indicated at 40, which is responsive to the movement of the cable 12, as it is let out and reeled in by a winch (not shown). The depth determining apparatus 40 is connected to a plotter/recorder 42 by a conventional, well-known cable-following device 44.

The data gathered by the string 10 is initially processed in the communications cartridge 22 and transmitted through the cable 12 by means of communication line 46 into the system processor 48. The system processor 48 is typically located above ground, and operates in real time. The function of the system processor 48 is to determine the elemental concentration in the formation and store the values. A plot or recording of the elemental concentrations at various depths within the borehole can be made at 42.

The tool string 10 includes three tool systems successively arranged along the housing 11 and which will be hereafter described, from top to bottom.

Below the communication cartridge 22 is provided the first tool system which is, in the preferred embodiment, a tool for measuring the natural gamma radiation of a plurality of elements, such as potassium, uranium and thorium. For convenience, this tool will be referred to as NGT. The NGT tool includes a gamma-ray detector 20 and is more fully described in U.S. Pat. No. 3,976,878 which is hereby incorporated by reference. The NGT detector 20 might be of the sodium iodide (NaI Tl) or bismuth germanate (BGO) type, and includes associated photomultiplier tubes and electronic circuitry, as known in the art, for measuring the number and energy distribution of the gamma rays incident upon the detector. The NGT tool typically includes circuitry, such as a spectrometer, which defines up to 256 energy "windows" in which counts may be accumulated and which are typically used for determining the naturally occurring concentrations of potassium (K), uranium (U) and thorium (Th). Typically, if as few as five windows are used, the first energy window spans an energy range from 0.15 to 0.5 MeV, a second window from 0.5 to 1.1 MeV, a third window from 1.1 to 1.6 MeV, a fourth window from 1.6 to 2 MeV, and a fifth window from 2 to 3 MeV. The uranium and thorium characteristic emissions fall in all the windows, and the potassium emission falls in the third window.

Below the NGT tool is provided an electronic cartridge 24 designed to acquire or otherwise process data coming from the different tool systems of the whole tool string 10.

Below the electronic cartridge 24 is disposed a second tool system which is designed to determine the relative elemental yields of elements of interest in the earth formations by irradiating the formation with neutrons and measuring yields of the gamma rays resulting from capture of neutrons by the atoms corresponding to these elements. For convenience, this second tool system will be referred to as the gamma spectroscopy tool or as the GST tool. The GST tool comprises, according to the invention, a main detector 21, an ancillary detector 23 and a high energy neutron generator 30. The generator 30 is preferably of the type which generates discrete pulses of fast neutrons, e.g. 14 Mev, and may for example be of the type described in more complete detail in U.S. Pat. Nos. 2,991,364 or 3,546,512. Further details on the GST tool can be found in U.S. Pat. Nos. 3,521,064, 4,055,763, 4,317,993, or 4,810,876, which are hereby incorporated by reference. The main detector 21 is surrounded by a cylindrical boron sleeve 25. The boron sleeve 25 may be placed outside the housing 11 so as to let as much room as possible for the detector 21, and hence to accommodate inside the housing 11 a detector having the largest possible diameter According to another feature of the invention, the outside wall of the housing, facing the neutron generator 30, is surrounded with a cylindrical sleeve 26 made of a high density material, such as tungsten. The ancillary detector 23 is optional, as will be explained below. The neutron generator 30 is placed in a compartment 29 the walls of which are made of a high density material, such as tungsten. The tungsten sleeve 26 and the tungsten compartment 29 permit an increase in the count rate of "capture" gamma rays as will be explained below.

The tool string includes a third tool system which is designed to determine the absolute aluminum concentration, and will be referred to as the AACT. The AACT tool includes the high energy neutron generator 30 (already referred to in connection with the GST tool) and an AACT detector 28, of the sodium iodide or BGO type and including associated photomultiplier tubes and electronic circuitry (such as a spectrometer), as known in the art, for measuring the number and energy distribution of the gamma rays incident upon the detector. The AACT detector 28 and its associated devices is similar or identical to the NGT detector 20. The neutron generator 30 is located immediately beneath the GST ancillary detector 23 and the AACT detector 28 is placed at the very bottom of the housing 11. A chamber 31, between the neutron generator 30 and the AACT detector 28, contains the generator 30 power supplies and controls (known per se).

Unlike the tools of the prior art, the GLT tool of the invention uses a single neutron source common to both the AACT and the GST tool systems, to wit the high energy generator 30.

The AACT tool is utilised in conjunction with the high energy neutron generator 30 to obtain activated aluminum count rates. The emitted neutrons slow down within the formation and are captured by the aluminum atoms, each of which in turn emits a delayed gamma ray at 1779 kev.

The logging tool string 10 according to the invention is hereafter described in one of its operative modes.

After the tool string 10 has been lowered in the borehole 14, at a given depth, the generator is turned on and the string is then raised at a given speed while acquiring data resulting from natural radioactivity and from the interaction of the neutrons emitted by the generator 30 with atoms of the earth formations 18.

The NGT tool measures the natural gamma radiation of potassium, uranium and thorium, as known in the art. The NGT tool also provides a natural background activity count rate measurement for correcting the aluminum measurement of the AACT. By methods well known in this art, if the NGT detector measures the background count rate due to naturally radioactive elements and the AACT detector 28 measures the total activity resulting from the activation by the source 30 of these elements and aluminum, then the background can be subtracted to provide a measured aluminum count rate.

The neutron generator 30 emits 14 Mev neutrons which interact with the atoms of the different elements in the earth formations. Schematically, three types of interaction may occur. The first type of interaction is an inelastic collision leading to the emission of a photon. The second type of interaction is the activation of an atom which results in the delayed emission of a gamma ray, the energy of which is characteristic of said atom. The third type of interaction, usually called capture, occurs when the neutrons lose their energy down to the thermal energy; the capture process results in the emission of one or several gamma ray(s).

The ancillary detector 23 is optional, as will be further explained. As known in the art, the GST tool, through the only use of the main detector 21, detects gamma rays resulting from the capture of the neutron by atoms of a plurality of elements of interest in the earth formations. Such elements comprise e.g. Si, Ca, Fe, S, H, or Cl, or any combination thereof. The main detector 21 is preferably made of BGO and is relatively large.

The AACT detector 28 detects the gamma rays resulting from the activation of aluminum which can be expressed by the formula:

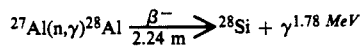

$$^{27}Al(n,\gamma)^{28}Al \xrightarrow[2.24\ m]{\beta^-} {}^{28}Si + \gamma^{1.78\ MeV}$$

As already stated, the tool string 10 according to the invention and as above described, contemplates substantial advantages over the tools of the prior art.

Firstly, the length of the tool is substantially reduced. By way of example, the total length can be about 18 feet for the tool according to the invention, while the prior art tools are usually about 50 feet long.

Secondly, the tool does not use a nuclear source, which reduces the safety concern.

Thirdly, the neutron generator has a higher neutron output than the californium source of the prior art, and thus increases the aluminum count rate by a factor of at least six and also allows one to operate the tool at a greater speed. As an example, the logging speed might be 1800 feet/minute, instead of a logging speed comprised in the range of 600-900 feet/minute for the prior art tools.

Fourthly, due to the tungsten sleeve 26 and the compartment 29 surrounding the generator 30, the capture count rates for Si, Ca, Fe, H and Cl are increased by 40%. As a matter of fact, the tungsten acts like a neutron multiplier according to the reaction (n,2n) and thus increases the overall number of neutrons. Furthermore, the average energy of the neutrons leaving the tungsten shields 26, 29 is lower than the energy of the neutrons at the output of the source; therefore, the path length necessary to slow down the neutrons to thermal energies is shorter, and thus the probability of interaction between the capture gamma rays and the detector is higher. Alternately, high density material other than tungsten can be used for the same purpose, such as e.g. lead.

Fifthly, since a single neutron source is used for both the "activation" and the "capture", no environmental correction is needed, such as a borehole correction, for the Al activation count rates in order to compute the elemental composition of the formation, such as described in the SPE paper already referred to.

Moreover, the tool string 10 according to the invention brings substantial improvements in the difficult problem of the distinction between the gamma rays from Al activation and the gamma rays from Si activation. This feature is all the more advantageous since the neutrons from the generator have higher energy than the neutrons emitted by the californium source of the prior art, and, therefore, may cause an increase in the Si activation process. The Si activation occurs with neutrons of at least 4 Mev, while the Al activation occurs mostly at thermal neutron energies (average thermal energy is e.g. 0.04 ev at room temperature).

The respective activations of Al and Si provide the emission of gamma rays of the same energy. Hereafter are summarized the respective Al and Si activations process:

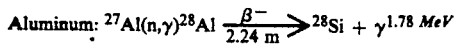

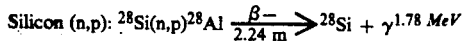

Thus, CT detector 28 will detect indifferently both gamma rays from Si and Al activation. The influence of this phenomenon, usually called "Si interference", should be reduced as much as possible. The Si interference can be expressed as the equivalent Al weight percent for the Si interference reaction. In other words, the percentage expresses what the apparent Al content would be in an earth formation layer made of Si (without Al), if the silicon signal was interpreted as an Al activation signal.

Several means are proposed by the method and tool according to the invention to reduce the probability of Si activation while increasing the probability of Al activation and/or to bring a correction to the Al count rates.

A first means is inferred from the use of the high energy neutron generator which provides a more accurate measurement of Al activation, due to the high neutron output of said generator.

A second means comprises the tungsten sleeves 26 and 29 surrounding the generator 30 which increases the count rates due to Al activation, relative to Si activation, by a factor of 1.4, because of the softening of the neutron energy spectrum due to the (n,2n) reaction in the tungsten sleeve.

A third means is based on the way the tool string is positioned in the borehole. As a matter of fact, the tool string, when placed at a certain distance or stand-off of the borehole wall, or when the tool is centered in the borehole, and everything else being the same, shows improved Si interference percentage, as can be seen from the table of FIG. 2 showing the different Si interference percentages for different borehole diameters and for different porosity values. The hydrogen atoms in the water in the borehole surrounding the tool reduce the energy of the neutrons which thus have less probability to activate Si, since Si activation requires a relatively high energy, 4 Mev at least. The tool may be provided with means for maintaining the tool at a certain stand-off from the borehole wall; preferably, the stand-off means a sleeve made of a material including hydrogen atoms, such as plastic. The tool may alternately comprises centering means, as known in the art.

A fourth means relies on the fact, discovered by the applicants, that the ratio of the count rates of gamma rays resulting from inelastic collisions with Si atoms to the count rates of gamma rays resulting from Si activation, is substantially independent of environmental parameters such as e.g. borehole size, stand-off, porosity, capture cross-section SIGMA. In other words, the ratio "inelastic count rates" to "activation count rates" is constant, as far as Si is concerned. The ratio can be estimated once and for all in a calibration facility. Thus, a measure of "Si inelastic" count rates would give a measure of the "Si activation" count rates which, in turn, will be subtracted from the total activation counts (i.e. Al+Si) measured by the AACT detector 28, to provide the net Al activation count rates. According to the invention, "Si inelastic" count rates are measured by the GST tool. The main detector 21 alone could be used for that purpose. However, the main detector 21 is mainly designed to deal with "capture" which (i) requires a large detector volume to be accurate, due to the relatively low count rate of the capture gamma rays, and (ii) occurs in time well after the "inelastic collision" phenomenon. This means that the main detector 21 might not be adequate for carrying out measurements related to the "inelastic" spectrum, since it would not be able to handle the high count rate occurring during the neutron burst, i.e. when the source generator is on. It can be seen from the above that "capture" and "inelastic" measurements require opposite characteristics Accordingly, the best mode for measuring the "Si inelastic" makes use of another detector, such as the ancillary detector 23 already referred to. In the embodiment shown where the GST is provided with two detectors, the main detector 21 is a large and relatively slow detector (made e.g. of BGO), and the ancillary detector 23 is a small and rapid detector (made e.g. of GSO, gadolinium orthosilicate). The main detector 21 measures the gamma rays resulting from capture, as already stated in connection with the description relative to the GST tool, and the ancillary detector 23 measures "Si inelastic" count rates. The "Si inelastic" count rates yield the "Si activation" count rates, as above stated, which are subtracted from the total activation count rates to give the net Al activation count rates. The ancillary detector 23 might also be used to measure gamma rays resulting from the interaction of neutrons with Mg atoms.

Another means for separating Al activation from Si activation, although not being the best mode, would be acceptable. According to this alternative means, the total activation count rates "N", as measured by the AACT detector 28, can be expressed as:

$$N = a\ Wt_{Al} + b\ Wt_{Si} \qquad (1)$$

where $Wt_{si} = F\ X_{si}(Y_{si}/S_{si})$, using the notation set forth in the SPE paper above referred to, "$Wt_{si}$" is the weight fraction of Si determined from natural activity, "F" is a depth dependent normalization factor, "$X_{si}$" is the ratio of the weight of the associated oxide or carbonate to the weight of Si, "$Y_{si}$" is the fraction of the measured prompt gamma ray spectrum attributed to Si, "$S_{si}$" is a relative spectral sensivity factor; "$Wt_{Al}$" can be inferred from these definitions by changing the subscript "Si" in "Al".

Equation (1) becomes:

$$N = a\ Wt_{Al} + (b\ X_{si}\ Y_{si}/S_{si})\ F \qquad (2)$$

Furthermore, it is known from said SPE paper, that:

$$F\ [SIGMA_i\ X_i\ (Y_i/S_i)] + X_k\ Wt_k + X_{Al}\ Wt_{Al} = 1 \qquad (3)$$

where $SIGMA_i$ is the sum for the all the "i" of: $X_i (Y_i/S_i)$

Thus, equations (1) and (3) can be solved simultaneously for the unknowns "$W_{Al}$" and "F", and the elemental weights are computed as described in said SPE paper.

What is claimed is:

1. A method for identifying and determining the concentrations of subsurface formation elements next to a borehole, comprising the steps of:
   (1) irradiating the formations with neutrons from a single energy neutron generator disposed in logging tool lowered in said borehole;
   (2) detecting and counting the gamma rays resulting from the activation of atoms of at least a first element;
   (3) determining from the counts of gamma rays the concentration of said first element;
   (4) detecting and counting the gamma rays resulting from the capture of said neutrons by atoms of at least a second element; and
   (5) determining from the count rates of capture gamma rays the concentration of said second element.

2. The method according to claim 1 further comprising the step of correcting the total count rates of the gamma rays resulting from activation of atoms of said first element and of another element which interferes with said first element.

3. The method according to claim 2 wherein said interfering element is silicon.

4. The method according to claim 3 wherein said correcting step comprises:
   (1) calculating the ratio of the count rates of gamma rays from activation of said interfering element to the count rates of the gamma rays resulting from the inelastic collisions of neutrons with atoms of said interfering element, thus providing a reference ratio independent of environmental parameters;
   (2) detecting and counting the gamma rays resulting from the inelastic collisions of the neutrons with atoms of said interfering element;
   (3) deriving from the measured count rates of inelastic gamma rays and from said reference ratio, the count rates of activation gamma rays relative to said interfering element; and
   (4) subtracting from the total count rates of activation gamma rays the count rates of the activation gamma rays relative to said interfering element.

5. The method according to claim 2 wherein the total count rates resulting from the activation of said first element and said interfering element are expressed as the weighted sum of the respective weight fractions of said first element, respectively of said interfering element, determined from natural activity.

6. The method according to claim 1 further comprising the step of surrounding said neutron generator with a material acting as an energy converter and as a neutron multiplier.

7. The method according to claim 6 wherein said material includes tungsten.

8. The method according to claim 1 wherein said first element is aluminum.

9. The method according to claim 1 further comprising the step of detecting and counting the gamma rays resulting from the capture of the neutrons by atoms of a first plurality of elements, and determining from the respective count rates of capture gamma rays relative to each element, the concentration of each element.

10. The method according to claim 9 wherein said first plurality of elements is selected from the group consisting of Si, Ca, Fe, S, H, or Cl, or any combination thereof.

11. The method according to claim 1 further comprising the step of detecting and counting the gamma rays resulting from the natural activity of atoms of at least a third element.

12. A logging tool for identifying and determining the concentrations of subsurface formation elements next to a borehole, comprising:
   (1) means for irradiating the formations with neutrons from a single high energy neutron generator disposed in a logging tool lowered in said borehole;
   (2) means for detecting and means for counting the gamma rays resulting from the neutron activation of atoms of at least a first element;
   (3) means for determining from the counts of gamma rays the concentration of said first element;
   (4) means for detecting and means for counting the gamma rays resulting from the capture of neutrons by atoms of at least a second element; and
   (5) means for determining from the count rates of capture gamma rays the concentration of said second element.

13. Logging tool according to claim 12 further comprising means for correcting the total count rates of the gamma rays resulting from activation of atoms of said first element and of another element which interferes with said first element.

14. Logging tool according to claim 13 wherein said interfering element is silicon.

15. Logging tool according to claim 13 wherein said correcting means comprises:
   (1) means for calculating the ratio of the count rates of gamma rays from activation of said interfering element to the count rates of the gamma rays resulting from the inelastic collisions of neutrons with atoms of said interfering element, thus providing a reference ratio independent of environmental parameters;
   (2) means for detecting and means for counting the gamma rays resulting from the inelastic collisions of the neutrons with atoms of said interfering element;
   (3) means for deriving from the measured count rates of inelastic gamma rays and from said ratio, the count rates of activation gamma rays relative to said interfering element; and
   (4) means for subtracting from the total count rates of activation gamma rays the count rates of the activation gamma rays relative to said interfering element.

16. The logging tool according to claim 12 further comprising a block surrounding said neutron generator and made of a material acting as a neutron multiplier and as an energy converter.

17. The apparatus according to claim 16 wherein said material includes tungsten.

18. Logging tool according to claim 12 wherein said first element is aluminum.

19. Logging tool according to claim 12 further comprising means for detecting and means for counting the gamma rays resulting from the capture of neutrons by atoms of a first plurality of elements, and means for determining from the respective count rates of capture gamma rays relative to each element, the concentration of each element.

20. Logging tool according to claim 19 wherein said first plurality of elements is selected from the group consisting of Si, Ca, Fe, S, H, or Cl, or any combination thereof.

21. Logging tool according to claim 12 further comprising means for detecting and means for counting the gamma rays resulting from the natural activity of atoms of at least a third element.

22. A logging tool for identifying and determining the concentrations of subsurface formation elements next to a borehole, comprising a housing in which are successively disposed, from top to bottom:

(1) means for detecting and means for counting the gamma rays resulting from the natural activity of atoms of at least one element;

(2) means for detecting and means for counting the gamma rays resulting from the capture of neutrons by atoms of at least another element;

(3) means for detecting and means for counting the gamma rays resulting from the inelastic collisions of the neutrons with atoms of an element which are able to interfere with the detection and count of gamma rays related to a further element;

(4) a single high energy neutron generator means for irradiating the formations with neutrons; and (5) means for detecting and means for counting the gamma rays resulting from the neutron activation of atoms of at least said further element.

* * * * *